United States Patent
Beebe et al.

(10) Patent No.: US 8,583,784 B2
(45) Date of Patent: Nov. 12, 2013

(54) DYNAMIC COMMUNICATION INTEGRATION WITH CALENDAR

(75) Inventors: Matthew Earl Beebe, Sunnyvale, CA (US); Jeremy Godfrey Lyon, Sunnyvale, CA (US)

(73) Assignee: PALM, Inc., Sunnyvale, CA (US)

( * ) Notice: Subject to any disclaimer, the term of this patent is extended or adjusted under 35 U.S.C. 154(b) by 708 days.

(21) Appl. No.: 12/572,146

(22) Filed: Oct. 1, 2009

(65) Prior Publication Data

US 2010/0312838 A1 Dec. 9, 2010

Related U.S. Application Data

(60) Provisional application No. 61/184,710, filed on Jun. 5, 2009.

(51) Int. Cl.
*G06F 15/173* (2006.01)
*G06F 15/16* (2006.01)

(52) U.S. Cl.
USPC ........... 709/224; 709/225; 709/217; 709/205; 709/206; 709/207

(58) Field of Classification Search
USPC ............... 709/224, 225, 217, 205, 206, 207
See application file for complete search history.

(56) References Cited

U.S. PATENT DOCUMENTS

| | | | |
|---|---|---|---|
| 6,898,569 B1 * | 5/2005 | Bansal et al. | 705/7.16 |
| 6,988,128 B1 | 1/2006 | Alexander et al. | |
| 7,327,834 B1 * | 2/2008 | Hiers et al. | 379/88.18 |
| 2003/0018816 A1 * | 1/2003 | Godfrey et al. | 709/246 |
| 2004/0168133 A1 * | 8/2004 | Wynn et al. | 715/541 |
| 2006/0073855 A1 * | 4/2006 | Bocking et al. | 455/567 |
| 2006/0230115 A1 * | 10/2006 | Brooke et al. | 709/206 |
| 2007/0055561 A1 * | 3/2007 | Perrella et al. | 705/9 |
| 2007/0070940 A1 * | 3/2007 | Vander Veen et al. | 370/328 |
| 2007/0073810 A1 * | 3/2007 | Adams et al. | 709/205 |
| 2007/0112929 A1 * | 5/2007 | Etelapera | 709/207 |
| 2007/0271376 A1 * | 11/2007 | Yach | 709/224 |
| 2007/0280459 A1 * | 12/2007 | Yee et al. | 379/201.01 |
| 2008/0162394 A1 * | 7/2008 | Horvitz et al. | 706/46 |
| 2008/0167937 A1 * | 7/2008 | Coughlin et al. | 705/9 |
| 2008/0189159 A1 | 8/2008 | Jain et al. | |
| 2008/0191896 A1 * | 8/2008 | Jain et al. | 340/825.22 |
| 2008/0270211 A1 * | 10/2008 | Vander Veen et al. | 705/8 |
| 2009/0125358 A1 * | 5/2009 | Reynard | 705/8 |
| 2009/0132329 A1 * | 5/2009 | Lam et al. | 705/9 |
| 2009/0168607 A1 | 7/2009 | Liu et al. | |
| 2009/0191896 A1 * | 7/2009 | Ge | 455/456.2 |

(Continued)

OTHER PUBLICATIONS

PCT International Search Report and Written Opinion, PCT Application No. PCT/US2010/037321, Dec. 27, 2010, 9 pages.

(Continued)

*Primary Examiner* — Karen Tang

(57) ABSTRACT

A system and a method are disclosed for dynamically generating a contextually desirable message ready for a user to send out to other participants of a scheduled event. A user context is determined for a scheduled calendar event and then logic rules applicable to the user context are identified and used to identify contextually desirable messages. Options for dynamically generating the contextually desirable messages are provided to the user along with information about the scheduled event. Upon a user selection of one of the options, the corresponding contextually desirable message is generated and its content is pre-populated according to the applicable logic rule.

16 Claims, 5 Drawing Sheets

(56) References Cited

U.S. PATENT DOCUMENTS

| | | | |
|---|---|---|---|
| 2009/0244000 A1* | 10/2009 | Thompson et al. | 345/156 |
| 2009/0327169 A1* | 12/2009 | Kamar et al. | 706/11 |
| 2010/0098230 A1* | 4/2010 | Bhow | 379/202.01 |
| 2010/0246792 A1* | 9/2010 | Acosta et al. | 379/202.01 |
| 2011/0077860 A1* | 3/2011 | Coughlin et al. | 701/204 |
| 2011/0258153 A1* | 10/2011 | Kamar et al. | 706/12 |
| 2012/0233548 A1* | 9/2012 | Zinn | 715/733 |

OTHER PUBLICATIONS

International Preliminary Report on Patentability issued Dec. 6, 2011, in international application No. PCT/US2010/037321.

* cited by examiner

DYNAMIC COMMUNICATION INTEGRATION WITH CALENDAR

CROSS REFERENCE TO RELATED APPLICATION

This application claims priority to U.S. Provisional Patent Application Ser. No. 61/184,710, filed on Jun. 5, 2009, which is herein incorporated by reference.

BACKGROUND

1. Field of Art

The disclosure generally relates to the field of calendar management in electronic computing environments.

2. Description of Art

A calendar user often wants to contact the organizer or other attendees of a meeting the user is scheduled to attend, either to share details or to give status. Even though the user has access to the information necessary for such communication in an event entry for a calendar (e.g., attendee email address and meeting information (time and place)), the process of creating messages corresponding to that event can be cumbersome. For example, the user must determine what is the information to be communicated to particular recipients; in such instances, granularity of that communication is not possible, e.g., communication with recipients based on their roles (e.g., organizer or attendee). Moreover, communications corresponding to subject and message body are difficult and only are in the context of a full message. The problem is exacerbated when considered in a mobile context, where time is constrained, and text entry can be inconvenient.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

General Overview

One embodiment of a disclosed system (and method and computer readable storage medium) that dynamically generates a contextually desirable message ready for a user to send out to other participants of a scheduled event. In one embodiment a disclosed configuration (or configurations) determines a user context for a scheduled calendar event, identifies logic rules applicable to the user context, provides options of contextually desirable messages identified by the applicable logic rules, and generates the contextually desirable messages based on user selection of the options.

Example Mobile Computing Device

Figure 1:
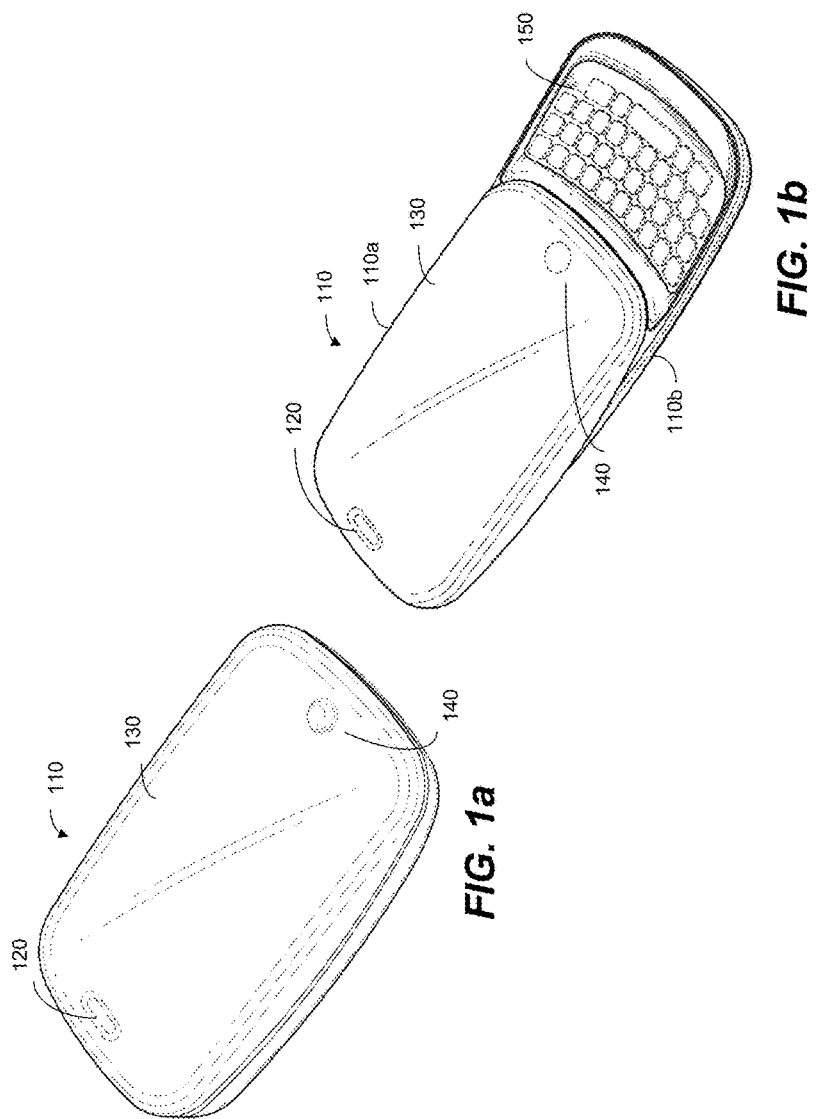
FIG. 1a illustrates one embodiment of a mobile computing device in a first positional state.
FIG. 1b illustrates one embodiment of the mobile computing device in a second positional state.

In one example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an email client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
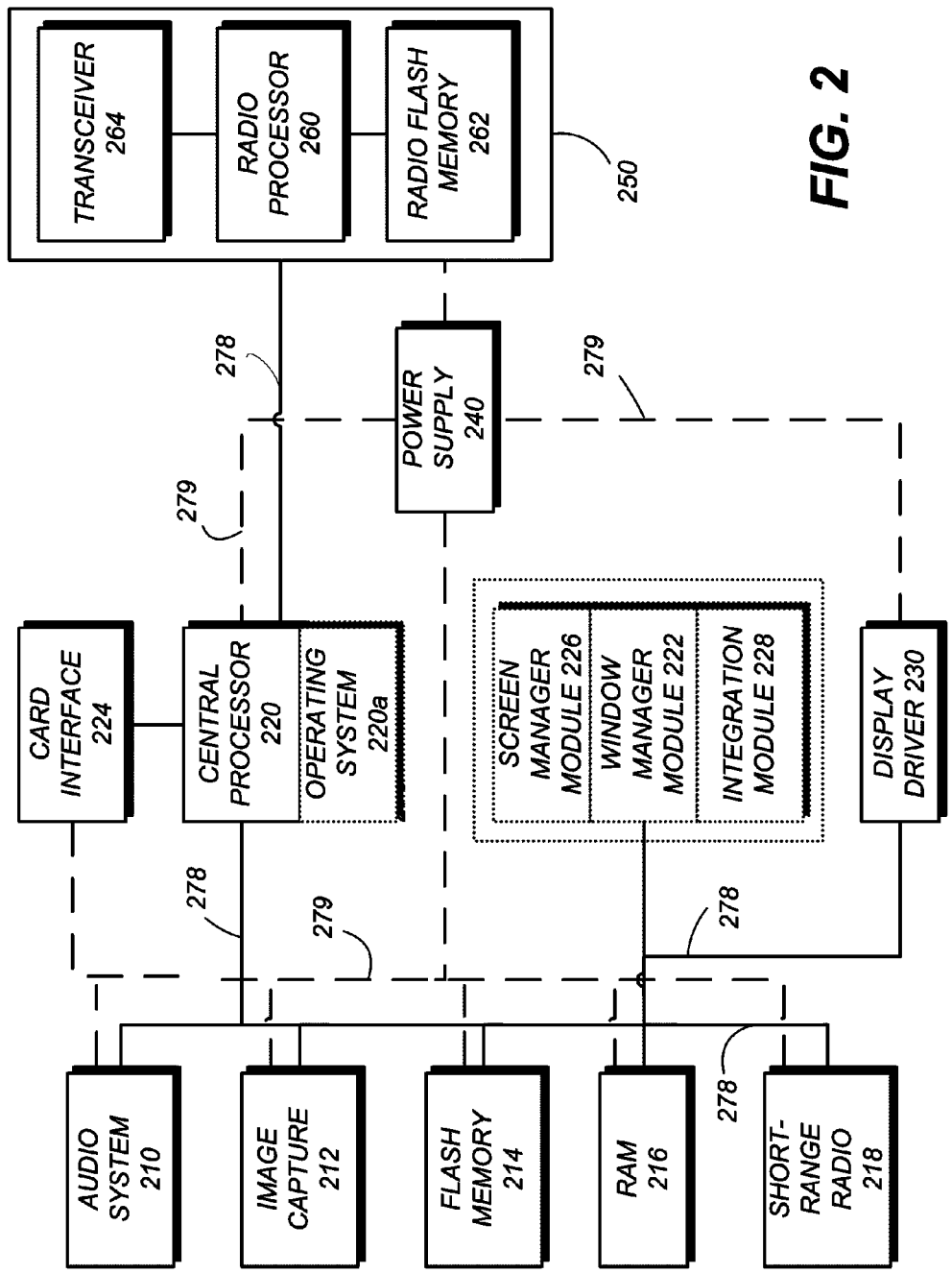
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 220 is configured for operation with a computer operating system 220a. The operating system 220a is an interface between hardware and an application, with which a user typically interfaces. The operating system 220a is responsible for the management and coordination of activities and the sharing of resources of the mobile computing device 110. The operating system 220a provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor 220 communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

It is noted that in one embodiment, central processor 220 executes logic (e.g., by way of programming, code, or instructions) corresponding to executing applications interfaced through, for example, the navigation area 140 or switches. It is noted that numerous other components and variations are possible to the hardware architecture of the computing device 200, thus an embodiment such as shown by FIG. 2 is just illustrative of one implementation for an embodiment.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

A calendar communication integration module (also referenced as integration module) 228 comprises a software and/or firmware. The integration module 228 is configured to dynamically provide options of contextually desirable messages to a user to be communicated to other participants of a scheduled event. The integration module 228 determines a user context of the scheduled event based on a calendar entry for the event, and identifies the options based on the user context and applicable logic (e.g., operational or business) rules. The options are displayed together with event information. The user can select a desirable message by conveniently activating (or selecting) the corresponding option. In response to a user selection, the integration module 228 generates the message and pre-populates it with recipient information, subject, and/or body text. Because the pre-populated message contains most, if not all, necessary information for communication, the user can send out the message as is or with minimum additional work (e.g., attaching a document to the message). Thus, the integration module 228 facilitates enhanced calendar/communication interaction with reduced overhead to communicate with other participants of a scheduled event.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120. The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Architectural Overview of Calendar Communication Integration Module

Figure 3:
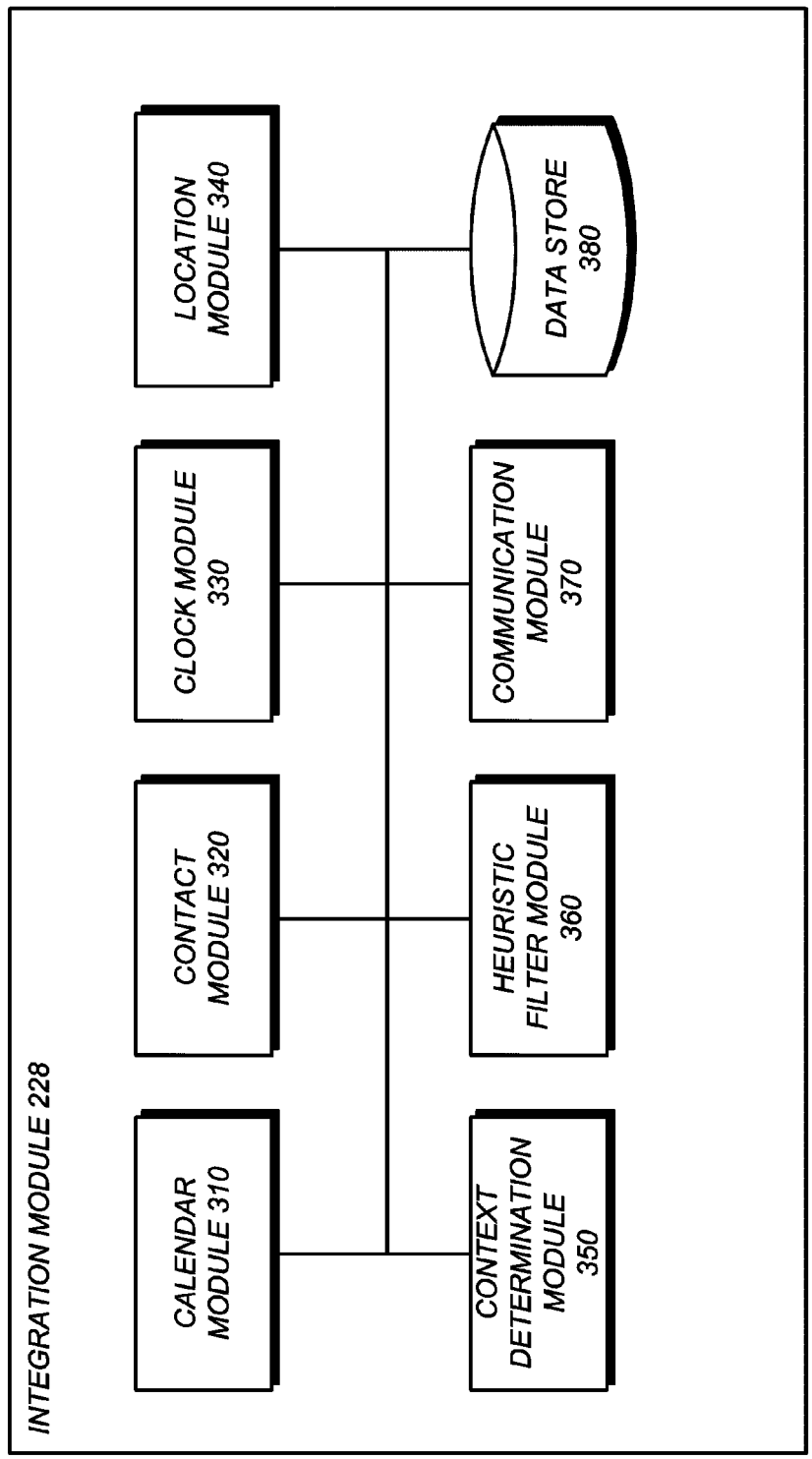
FIG. 3 illustrates one embodiment of modules within a calendar communication integration module.

Referring now to FIG. 3, a high-level block diagram illustrating one example of a detailed view of modules within a calendar communication integration module 228 according to one embodiment. Some embodiments of module 228 have different and/or other modules than the ones described herein. Similarly, the functions can be distributed among the modules in accordance with other embodiments in a different manner than is described here. As illustrated, the calendar communication integration module 228 includes a calendar module 310, a contact module 320, a clock module 330, a location module 340, a context determination module 350, a heuristic filter module 360, a communication module 370, and a data store 380.

The calendar module 310 retrieves calendar entries from a user calendar, extracts event information from the calendar entries, and displays the extracted event information together with options for dynamically generating contextually desirable messages. The user calendar can be a local calendar residing on the mobile computing device 110 or a remote calendar hosted by an online calendar platform (e.g., MICROSOFT EXCHANGE SERVER, GOOGLE CALENDAR, YAHOO! CALENDAR, etc.). Example event information extracted from a calendar entry include participation information (i.e., identity of the organizer and other participants, role of the user), venue information (i.e., address, longitude and latitude), and scheduled time and duration. The event information can be identified and extracted based on their associated tags (e.g., setField tag). Alternatively or additionally, the event information can be extracted using pattern recognition technologies (e.g., MM-DD-YYYY for scheduled dates) and/or known schema/template. The calendar module 310 displays event information automatically (e.g., scheduled reminder) and/or upon request (e.g., responsive to a user selection). The options are displayed (e.g., as a soft button) along with the extracted event information (e.g., in the event editing window or the reminder dialog box).

The contact module 320 retrieves contact information for participants of a calendar entry, and provides it to the communication module 370 to generate contextually desirable messages. Contact information includes information such as an electronic mail (email) address, phone number (e.g., mobile phone number), SKYPE account number, etc. The contact module 320 can retrieve the contact information from contact management applications and/or external sources such as the MICROSOFT EXCHANGE SERVER and SALESFORCE CRM. Alternatively or additionally, the contact module 320 can extract the contact information from the event information of the calendar entry.

The clock module 330 determines the local date and time corresponding to the location of the mobile computing device 110. It may be automatically set or manually set. For automatic settings of the clock module 330, it may be set based on timing information from a local source (e.g., a clock generator circuit) and/or an external source such as a mobile phone service network or a combination of a GPS system (identifying location) and optionally software (configured to find location time corresponding to that location).

The location module 340 determines a device location of the mobile computing device 110. The location module 340 makes the determination based on location information from a GPS receiver and/or signals from the transceiver 264 (e.g., using triangulation). Because the user generally carries the mobile computing device 110 in person, the device location can be used as the location of the user. Other components such as accelerometers and the like may also be integrated with the mobile computing device 110. Hence, in one embodiment, in addition to a device location, module 340 also determines device movement information, such as speed and direction, and makes intelligent estimates of whether the user will arrive at the venue of the scheduled event at the schedule time.

The context determination module 350 determines a user context by gathering contextual information from sources such as modules 310, 330, 340. The user context includes information such as event description (e.g., invention disclosure meeting), the user's role (e.g., organizer, required/optional/confirmed/tentative participant), venue information (e.g., Headquarter Site, Building 3), schedule information (e.g., starting at Wed., Mar. 25, 2009, 3:35 PM and lasting for 1.5 hours), current (or present) device location, and current time.

The heuristic filter module 360 identifies logic rules (e.g., operational or business) that are applicable to the current user context, and provides the user with the option of creating one or more contextually desirable messages specified by the applicable logic rules. A logic rule correlates a user context of a calendar entry with one or more messages to other participants about the calendar entry that may be desirable in the specific user context. If the user selects the option, module 360 generates the message, pre-populates message contents (e.g., recipients, subject, and/or text content) according to the applicable logic rule, displays the generated message, and enables the user to either send the message right away or further edit the message. The message generated by module 360 can be of different types, such as voice messages, Short Message Service (SMS) messages, and email messages, as specified by the logic rule and/or the user.

The communication module 370 transmits the generated messages to their recipients. Based on their message types (e.g., SMS message, email message), module 370 delivers the messages through different delivery channels. For example, module 370 delivers voice messages through a voice network, and text messages (e.g., SMS messages and email messages) through a data network.

The data store 380 stores data used and/or generated by the calendar communication integration module 228. Examples of such data include calendar entries, contact information, logic rules, and generated messages. The data store 380 may be a relational database or any other type of database.

Logic Rules

Logic rules include heuristic logic that correlate user context of a calendar entry with messages with other participants about an underlying event that are desirable in such user context. It is often desirable for a participant of a scheduled event (e.g., a meeting) to contact other participants (e.g., the organizer, and/or the other attendees) for topics such as sharing details (e.g., to set a venue, or to provide documents to be used in the meeting) and to give status (e.g., to notify the possibility of being late or additional attendee). For example, an organizer of a meeting often sends a meeting reminder to the other participants before the meeting starts. As another example, after the meeting ends, the meeting organizer often sends invitations to the participants to schedule a follow-up meeting. The relationship of these contexts and the messages desirable in such contexts are described in logic rules.

In one example embodiment, a logic rule includes a context requirement identifying when the particular rule is applicable. The context requirement includes criteria such as the nature of the calendar entry in terms of what activity or event the entry relates to (e.g., a meeting, an interview, a review), the relationship between the scheduled time and the current time (e.g., before the meeting starts, during the meeting, or after the meeting finishes), the user's role (e.g., whether the user is the organizer, a required participant, an optional participant, or a resource provider), and the relationship between the scheduled venue and the current device location (e.g., whether the device is near the venue), to name a few. If the current user context satisfies the context requirement of a logic rule, then the logic rule is determined applicable.

In another example embodiment, a logic rule identifies one or more contextually desirable messages to other participants of a scheduled event about the event, and specifies how to generate the message(s). Examples of the messages include a meeting reminder, notification of being late, venue change, follow-up meeting arrangement, to name a few. A logic rule specifies the content of the message (e.g., subject, message body), recipient(s) (e.g., to the meeting organizer only or to all meeting attendees), and message type (e.g., voicemail, SMS message, email message).

Listed below are several example logic rules:

If a meeting is scheduled to start in two hours, and the user is the organizer of the meeting, then prompts the user with the option of sending an email message reminder. The title of the message is "Meeting Reminder: %%", where %% represents the title of the calendar entry. The recipients are all confirmed participants of the meeting. The body of the message is "Time: $$, Venue: ##", where $$ represents the scheduled starting time and ## stands for the scheduled location.

If a meeting is scheduled to start in five minutes, and the user is the organizer of the meeting, then prompts the user with the option of sending a SMS message reminder. The body of the message is "Meeting Reminder: %%", where %% is the title of the calendar entry. The recipients are all confirmed participants of the meeting.

If a meeting is scheduled to start according to its calendar entry, the device location is distant from the meeting venue, and the user is not the organizer of the meeting, then prompts the user with the option of sending a notification for being late. The title of the message is "Running Late: %%", where %% represents the title of the calendar entry. The recipient is the organizer of the meeting. The body of the message is empty. This entry may also include rules that provide an estimated time of arrival (or delay amount). This information can be provided manually or by using global positioning system (GPS) and/or other data, e.g., weather and traffic conditions, to estimate an arrival time that can be compared to the meeting start time.

If a meeting already ended according to its calendar entry, and the user is the organizer of the meeting, then prompts the user with the option of sending a follow-up email message. The title of the message is "Follow-up: %%", where %% represents the title of the meeting. The recipients are all confirmed participants of the meeting. The body of the message is empty.

By applying the above example logic rules, the heuristic filter module 360 creates messages pre-populated with desirable contextual information that are ready for the user to send out with minimum edits. For example, assuming Bob is the organizer of a meeting titled "Sales Meeting" and is stuck in traffic far from the meeting location. The calendar communication integration module 228 running on his mobile computing device 110 would apply one or more logic rules to create the following message pre-populated with information related to the meeting:
Addressed to: all meeting participants
Subject: Re: Sales Meeting
Body: Stuck in traffic, running late!—Bob
Bob can then further edit the message body and send out the message to the meeting participants. The following is an example of the final message sent to the meeting participants:
Addressed to: all meeting participants
Subject: Sales Meeting
Body: Stuck in traffic, running late! I will have to call in, please start the meeting.—Bob
Because the address to field and the subject are both pre-populated, and the message body is also at least partially pre-populated, Bob only needs to type in a single sentence before sending out the message.

As another example, assuming Sarah is a participant in a meeting titled "Staff Meeting" and has a conflicting event scheduled at the same time. The calendar communication integration module 228 running on Sarah's mobile computing device 110 would apply one or more logic rules to create the following message pre-populated with information related to the meeting:
Addressed to: meeting organizer
Subject: Staff Meeting
Body: I have a conflict and I am running late.—Sarah
Sarah can choose to either further edit the pre-populated message body to provide additional content or simply send out the message as is.

As noted, the above are examples and may be augmented by additional rules. The augmented rules can be from an administrative body, e.g., IT department, or can evolve, e.g., a self taught rule originated from a base rule or from consistent operation corresponding to a particular type of event. In addition, the user can add new logic rules, and modify and/or delete existing logic rules as desired.

Context-Specific Message Generation

Figure 4:
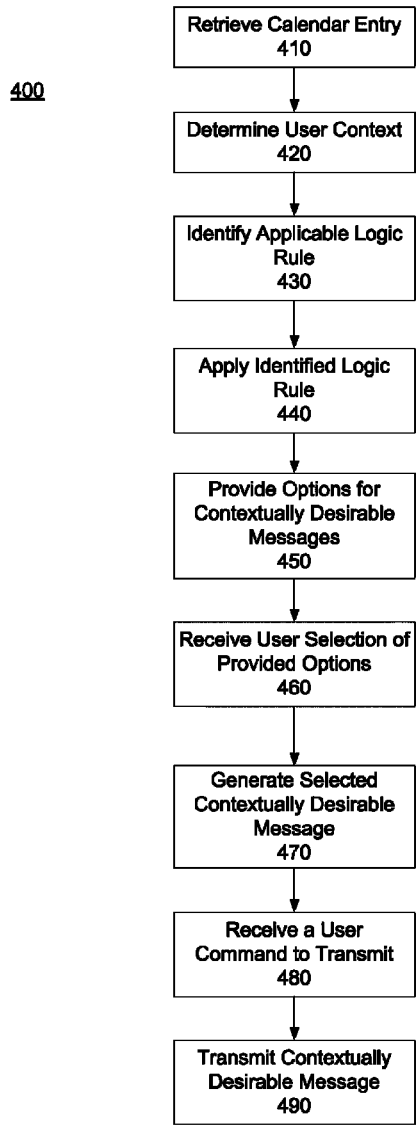
FIG. 4 illustrates one embodiment of a process for dynamically generating a contextually desirable message.

FIG. 4 is a diagram illustrating a process 400 for dynamically generating context-specific messages by the integration module 228, according to one embodiment. Other embodiments can perform the steps of the process 400 in different orders. Moreover, other embodiments can include different and/or additional steps than the ones described herein.

As shown, initially, the integration module 228 retrieves 410 a calendar entry. The retrieval 410 can be initiated by the user. For example, the user can select the calendar entry from a calendar for display. In response to the user selection, the integration module 228 retrieves 410 the selected calendar entry. Alternatively, the integration module 228 can automatically retrieve 410 the calendar entry. For example, the integration module 228 is configured to periodically check the up-coming scheduled events in the user's calendar(s), and retrieves 410 a calendar entry when its reminder is due (e.g., according to its schedule information).

The integration module 228 determines 420 a user context of the calendar entry by extracting event information from the calendar entry. A calendar entry includes information such as the identity of the organizer, status of the user (e.g., tentative, confirmed, required, optional), role of the user (e.g., organizer, attendee), scheduled time and venue. The integration module 228 also determines 420 context information such as the device location, and the current time using components such as the clock module 330 and the location module 340.

The integration module 228 identifies 430 logic rules applicable to the determined user context. The integration module 228 examines the logic rules and identifies 430 those whose context requirements are satisfied by the user context as applicable logic rules. The integration module 228 applies 440 the identified logic rules to determine messages the user may be interested in sending out, and provides 450 the user with an option to dynamically generate one of such messages. The option is displayed together with the event information extracted from the calendar entry. For example, the option can be displayed as a soft button in a reminder dialog box and an event editing window of the calendar entry.

The integration module 228 receives 460 a user selection of the options, and generates and displays 470 the corresponding contextually desirable message. The integration module 228 pre-populates the message according to the applicable logic rule. For example, if the user is an attendee of a meeting, then the integration module 228 addresses the message only to the organizer of the meeting. The integration module 228 also generate the subject and/or body text of the message (if there is one) using information such as the title of the calendar entry.

The integration module 228 receives 480 a user command to transmit the message, and transmits 490 the message using a delivery channel that is suitable to the message type. The user may choose to edit the message before sending it out.

Figure 5B:
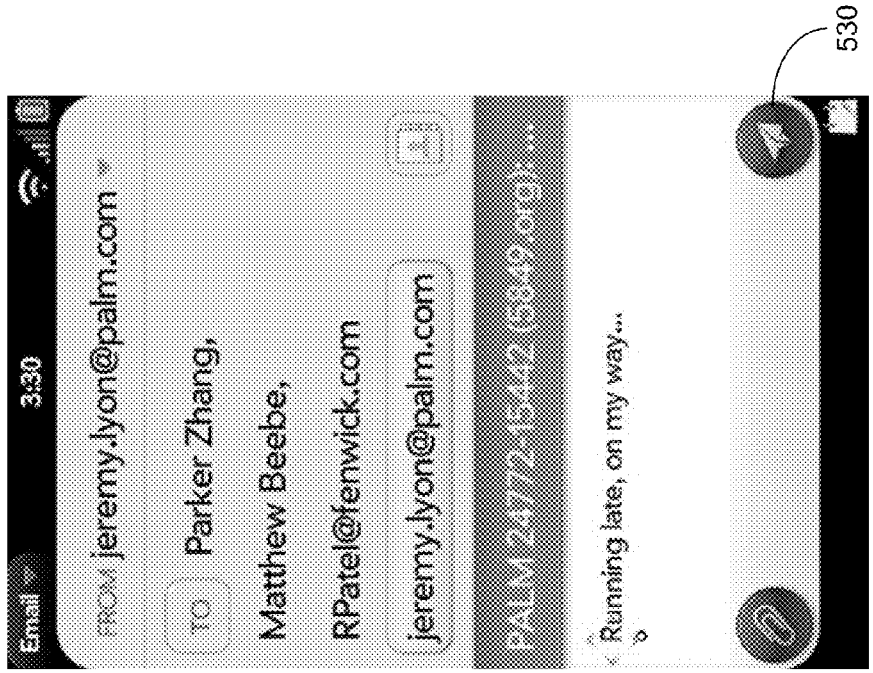
FIGS. 5a and 5b are screenshots of the mobile computing device according to one embodiment.
Figure 5A:
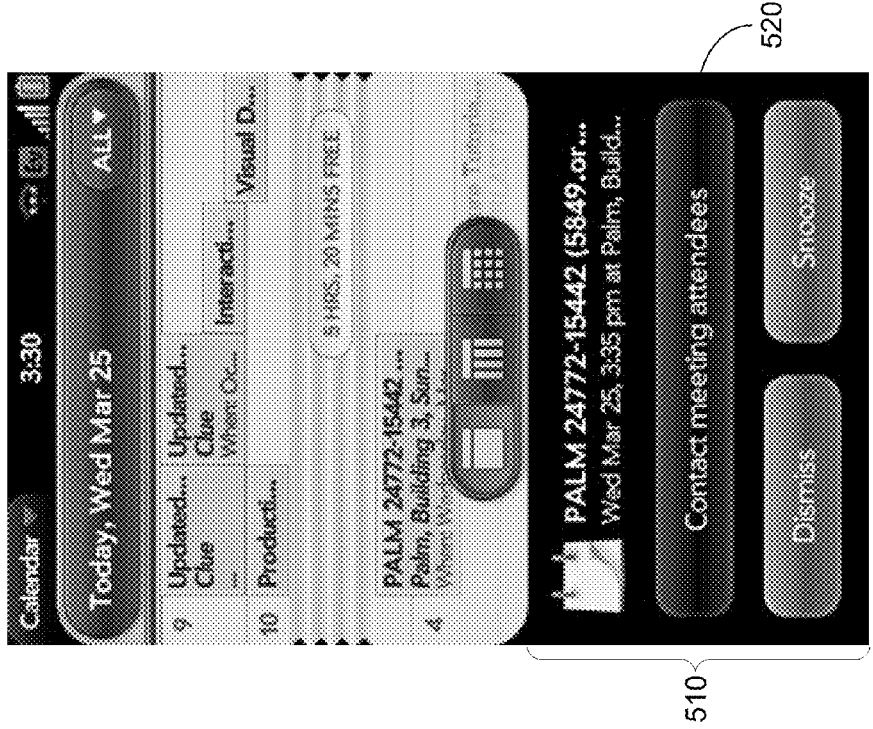

Process 400 is illustrated in further detail through the following example and FIGS. 5a-5b. A user of a mobile computing device 110 organized a meeting that is scheduled to start on 3:35 PM, Wed. Mar. 25 at headquarter site, building 3. The meeting has three other attendees beside the user. A calendar entry was created for the meeting and includes the schedule and participation information.

At 3:30 PM, the integration module 228 retrieves 410 the calendar entry (e.g., according to the reminder schedule set in the calendar entry), and determines 420 a user context for the meeting (e.g., the user is the meeting organizer, the meeting will start in 5 minutes, and the user is not in building 3). The integration module 228 identifies 430 an applicable logic rule such as the following: if a meeting is scheduled to start in five minutes, the user is the organizer of the meeting, and the user is away from the scheduled venue, then prompts the user with the option of sending an email message to all attendees notifying that the user is running late for the meeting. The integration module 228 applies 440 the identified logic rule and provides 450 an option for dynamically generating the message specified by the logic rule. The option is illustrated in FIG. 5a, a screenshot of the mobile computing device 110. As shown, the screenshot includes a calendar reminder 510 of the meeting with a soft button 520 labeled "Contact meeting attendees" for the user to activate (or select).

The integration module 228 receives 460 a user selection of the provided option (e.g., the user activates the button 520), and generates 470 the message and pre-populates its content as specified by the logic rule. FIG. 5b illustrates a screenshot of a screen 130 of the mobile computing device 110 showing such a dynamically generated message. As shown, the message is pre-populated (or preformatted) with the recipients, the other attendees of the meeting, the subject, and a body text, and is ready to be sent out. The user can simply press the send button 530 to send the message out.

The integration module 228 receives 480 a user command to transmit (e.g., the user activates the button 530), and transmits 490 the message to the other meeting attendees, notifying them that the user will attend the meeting but will be late.

Context-Specific Email Subject Generation

According to one embodiment, the integration module 228 enables the user to individually contact any of the participants of a calendar entry. The integration module 228 displays a calendar entry along with its attendees (e.g., in an event editing window). The user can choose to contact any of the listed attendees. Responsive to the user selection, the integration module 228 automatically generates an email message addressed to the selected attendee, and populates the subject line based on the relationship between the calendar entry and the current time. Description of the relationship can be determined through one or more logic rules. For example, the integration module 228 can determine the description by applying the following example logic rules:

If the calendar entry is scheduled within the day before the current time, use "Yesterday's" to describe the calendar entry.

If the calendar entry is scheduled within the same day as the current time, use "Today's" to describe the calendar entry.

If the calendar entry is scheduled within the next day after the current time, use "Tomorrow's" to describe the calendar entry.

If none of the above rules apply, use the date of the calendar entry to describe the calendar entry.

For example, if the meeting is titled "Invention Disclosure" and is scheduled for the next day, the subject line will be "Tomorrow's Invention Disclosure meeting".

Contact Reminder

According to one embodiment, when a communication is made with a contact through the mobile computing device 110, additional information associated with the contact can be displayed to facilitate enhanced communication. For example, when the heuristic filter module 360 generates an email message (or voice message, SMS messages), and/or a telephone application (e.g., SKYPE) initiates (or receives) a phone call with a particular contact, the module 360 displays information about future (or present, past) scheduled calendar events that this contact participates.

As another example, the user can create one or more contact reminders (e.g., through the contact module 320) for a particular contact, and provide notes in the contact reminders. The contacts and associated contact reminders can be stored together in a contact database. Subsequently, when the user initiates a phone call to the contact (or receives a phone call from) the contact, the mobile computing device 110 notifies the user the contact reminders by displaying the content of the contact reminders. As a result, the user is beneficially reminded of the underlying issue and can talk about the issue during the phone call if desired.

In addition, when a context-specific message is pre-populated for a calendar entry, the heuristic filter module 360 can be configured to prompt the user with an option of importing contact reminders of the message recipients. If the user desires, content of the contact reminders associated with the message recipients can be incorporated into the body of the pre-populated message. As a result, the recipients will be reminded of the underlying issues in the pre-populated message.

Additional Embodiments

According to one additional embodiment, the logic rule can be configured to automatically generate and transmit certain desirable messages without prompting the user for permission. For example, one such logic rule can specify that if a meeting is scheduled to start within an hour, the user is listed as an optional attendee, and the user is currently on vacation (according to the user's calendar), then send a notification to the meeting organizer stating that the user will be absent from the meeting.

Some portions of above description describe the embodiments in terms of algorithms and symbolic representations of operations on information, for example, as illustrated and described with respect to FIGS. 2, 3, and 4. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing users with options of dynamically generating contextually desirable messages to participants of a scheduled event through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for providing messages on a computing device, comprising:
    retrieving a calendar event associated with a user from a calendar program, the calendar event including information about at least one participant other than the user;
    determining a user role for the user based on the calendar event, the user role corresponding to at least one of an organizer or an attendee;
    making a determination that the user role is the attendee of the calendar event but not the organizer;
    determining a time information corresponding to a time of the calendar event relative to a current time;
    identifying a rule from a plurality of rules based on the determined user role and the time information, each of the plurality of rules identifying different content for a message;
    displaying an interface on a display of the computing device, the interface including a selectable feature, that when selected, pre-populates a message to be sent to the at least one participant with content corresponding to the identified rule and information of the calendar event;
    in response to a user selection of the selectable feature, pre-populating the message with content corresponding to the identified rule and information of the calendar event, wherein pre-populating the message includes (i) pre-populating the message with the organizer of the calendar event as a recipient of the message, and (ii) displaying the message on the display to enable the user to edit the content before the message is transmitted; and
    transmitting the message to the at least one participant, wherein transmitting the message to the at least one participant includes transmitting the message to the organizer of the calendar event.

2. The computer-implemented method of claim 1, wherein transmitting the message to the at least one participant is performed in response to receiving a user input.

3. The computer-implemented method of claim 1, wherein pre-populating the message includes pre-populating the message with all participants of the calendar event as recipients of the message, and wherein transmitting the message to the at least one participant includes transmitting the message to all participants of the calendar event.

4. The computer-implemented method of claim 1, wherein determining the time information comprises determining that the current time precedes the time of the calendar event, and wherein the content corresponding to the identified rule includes an event reminder for the calendar event.

5. The computer-implemented method of claim 1, wherein determining the time information comprises determining that the time of the calendar event precedes the current time, and wherein the content corresponding to the identified rule includes an invitation to schedule a follow-up event for the calendar event.

6. The computer-implemented method of claim 1, wherein the message comprises: an email message, an SMS message, or a voice message.

7. The computer-implemented method of claim 1, wherein transmitting the message to the at least one participant is performed automatically.

8. A computer-implemented method for providing messages on a computing device, comprising:
    determining a user information for a user of the computing device based on a calendar event scheduled for the user to attend, the user information including a user role corresponding to at least one of an organizer or an attendee of the calendar event;
    making a determination that the user role is the attendee of the calendar event but not the organizer;
    identifying a rule from a plurality of rules based on the user information, each of the plurality of rules identifying different content for a message;
    displaying an interface on a display of the computing device, the interface including a selectable feature, that when selected, pre-populates a message with content corresponding to the identified rule and information of the calendar event;
    in response to a user selection of the selectable feature, pre-populating the message with content corresponding to the identified rule and information of the calendar event, wherein pre-populating the message includes (i) pre-populating the message with the organizer of the calendar event as a recipient of the message, and (ii) displaying the message on the display to enable the user to edit the content before the message is transmitted; and
    transmitting the message to at least one other participant of the calendar event, wherein transmitting the message to the at least one participant includes transmitting the message to the organizer of the calendar event.

9. The computer-implemented method of claim 8, wherein the user information further includes at least one of:
    a user role in the calendar event,
    a current location of the computing device,
    an event description for the calendar event,
    a venue for the calendar event, or
    time information of the calendar event.

10. The computer-implemented method of claim 9, wherein the user role further corresponds to at least one of: a required participant, an optional participant, or a resource provider.

11. The computer-implemented method of claim 10, wherein pre-populating the message includes pre-populating the message with all participants of the calendar event as recipients of the message, and wherein transmitting the message to the at least one other participant includes transmitting the message to all participants of the calendar event.

12. The computer-implemented method of claim 8, wherein determining the user information comprises determining that a current time precedes a scheduled time of the calendar event, and wherein the content corresponding to the identified rule includes an event reminder for the calendar event.

13. The computer-implemented method of claim 8, wherein determining the user information comprises determining that a scheduled time of the calendar event precedes a current time, and wherein the content corresponding to the identified rule includes an invitation to schedule a follow-up event for the calendar event.

14. The computer-implemented method of claim 8, wherein determining the user information comprises determining that a scheduled time of the calendar event being close to a current time, determining a current location of the computing device is a distance from a venue of the calendar event, and wherein the content corresponding to the identified rule includes a notice that the user is running late for the calendar event.

15. The computer-implemented method of claim 8, wherein the message comprises: an email message, an SMS message, or a voice message.

16. The computer-implemented method of claim 8, wherein transmitting the message to at least one other participant is performed automatically.

* * * * *